(12) United States Patent
Chang

(10) Patent No.: US 9,575,709 B2
(45) Date of Patent: Feb. 21, 2017

(54) DISPLAY DEVICE

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/819,598

(22) Filed: Aug. 6, 2015

(65) Prior Publication Data

US 2016/0321023 A1  Nov. 3, 2016

(30) Foreign Application Priority Data

Apr. 29, 2015  (CN) .......................... 2015 1 0210296

(51) Int. Cl.
  *G06F 3/14*  (2006.01)
(52) U.S. Cl.
  CPC ........... *G06F 3/1423* (2013.01); *G06F 3/1446* (2013.01); *G09G 2300/026* (2013.01)
(58) Field of Classification Search
  CPC .................. G09G 2300/026; G06F 3/1446
  See application file for complete search history.

(56) References Cited

U.S. PATENT DOCUMENTS

2006/0170614 A1* 8/2006 Tzong ..................... G09F 19/18
  345/1.3
2010/0238090 A1* 9/2010 Pomerantz .......... G02F 1/13336
  345/1.3

* cited by examiner

*Primary Examiner* — Dwayne Bost
*Assistant Examiner* — Sepehr Azari
(74) *Attorney, Agent, or Firm* — Zhigang Ma

(57) ABSTRACT

The present disclosure relates to a display device, the display device includes a display screen, at least one laser device, a microprocessor and at least one reflection stripe. The display screen is consisted by at least two displays arranged at a matrix, and each display includes frames. The laser device includes a laser scanning system and a laser projector. The microprocessor is used to process image, then transfer the image to the at least two displays and the laser projector of the at least one laser device respectively. The at least one reflection stripe covers the frames between each two of the at least two displays, the laser projector project the image to the reflection stripe, the image displayed on the display screen and the image projected on the reflection stripe by the laser projector form a complete picture.

9 Claims, 3 Drawing Sheets

DISPLAY DEVICE

FIELD

The subject matter herein generally relates to a display device, and particularly relates to a display device composed of multiple displays.

BACKGROUND

A display device having large size, such as an outdoor display screen, is widely used. Because of limited size of a single display screen, the outdoor display screen is generally composed of several display units, and the several display units are used to show a whole picture together. Each display unit includes several borders which divide the picture to several parts.

BRIEF DESCRIPTION OF THE DRAWING

Implementations of the present technology will now be described, by way of example only, with reference to the attached figures, wherein.

DETAILED DESCRIPTION

Figure 1:
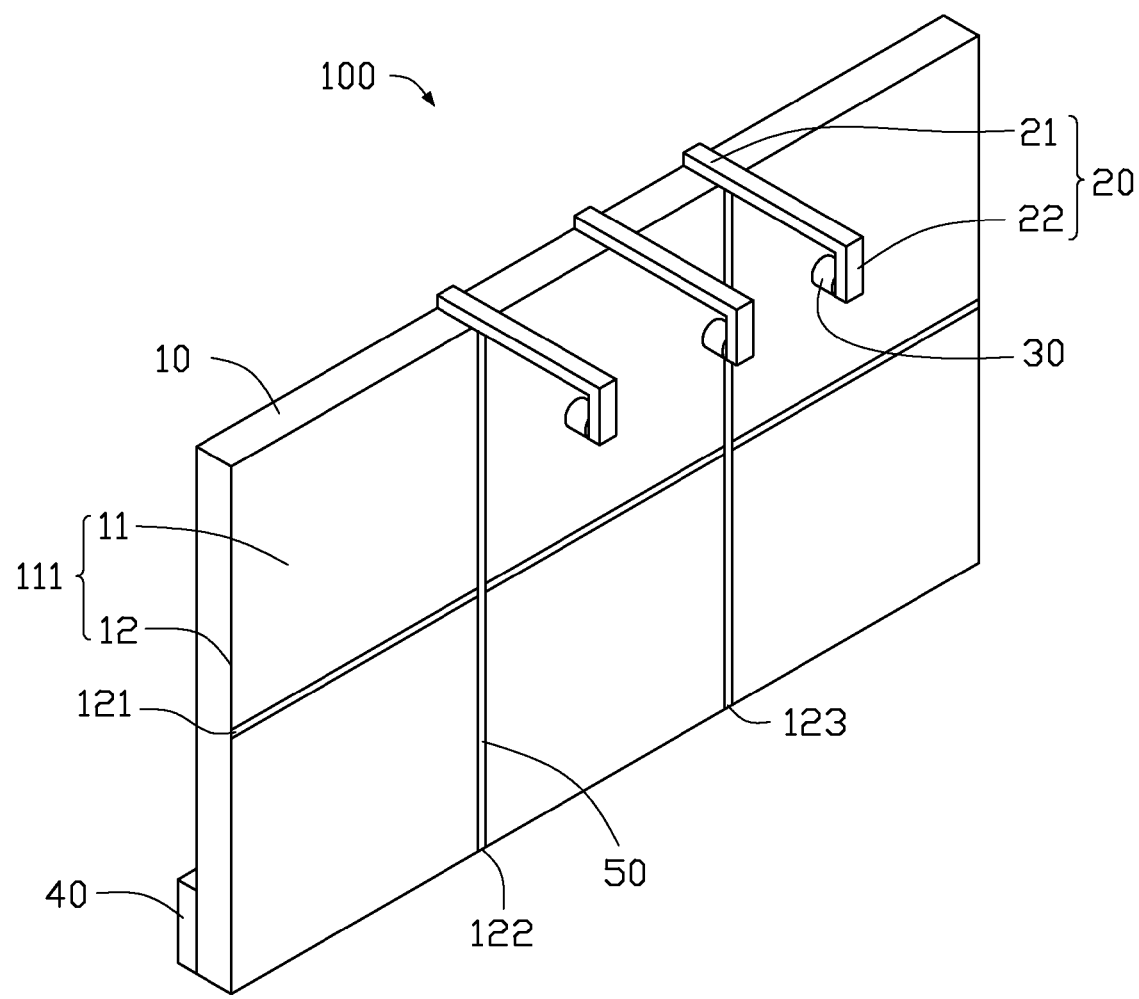
FIG. 1 is an isometric view of an embodiment of a display device of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
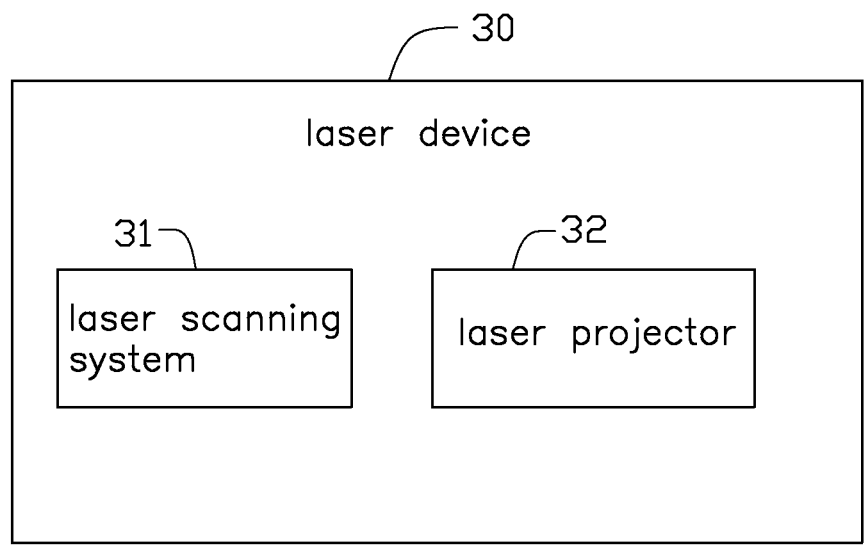
FIG. 2 is a block diagram of a laser device of the display device of FIG. 1.

FIGS. 1-2 illustrate an embodiment of a display device 100 of the present disclosure, the display device 100 includes a display screen 10, at least one structural support 20, at least one laser device 30, a microprocessor 40 and at least one reflection stripe 50.

The display screen 10 is substantially rectangular-shaped. It is understood that in other embodiments, the display screen 10 can be other shapes, such as trapezoidal-shaped. The display screen 10 includes at least two displays 111. In the embodiment, the number of the at least two displays 111 is six. The six displays 111 are arranged to form a 3×2 matrix, each display 111 is substantially square-shaped and includes a display surface 11 and four frames 12. Heads and tails of the four frames 12 are connected to each other, thereby form a square frame, the display surface 11 is surrounded by the square frame. Tangent frames of the six displays 111 form a first combined frame 121, a second combined frame 122 and a third combined frame 123 respectively. The first combined frame 121 is substantial parallel to a horizontal direction of the matrix, and the second combined frame 122 and the third combined frame 123 connect to the first combined frame 121 perpendicularly. Length of the first combined frame 121 is three times of length of the frame 12, length of the second combined frame 122 and the third combined frame 123 are respectively two times of the length of the frame 12. Width of the first combined frame 121, the second combined frame 122 and the third combined frame 123 are respectively two times of width of the frame 12.

The at least one structural support 20 is substantial L-shaped. The at least one structural support 20 is used to support the at least one laser device 30. In the embodiment, the number of the at least one structural support 20 is three. Each the structural support 20 includes a fixing end 21 and a supporting end 22.

In the illustrated embodiment, the number of at least one laser device 30 is three. FIG. 2 shows that each laser device 30 includes a laser scanning system 31 and a laser projector 32. The laser scanning system 31 is used to scan images displayed by the six display 111, the first combined frame 121, the second combined frame 122 and the third combined frame 123. The three laser projector 32 are respectively used to project image on the at least one reflection stripe 50 that located on the first combined frame 121, the second combined frame 122 and the third combined frame 123.

The microprocessor 40 is used to process the image.

Figure 3:
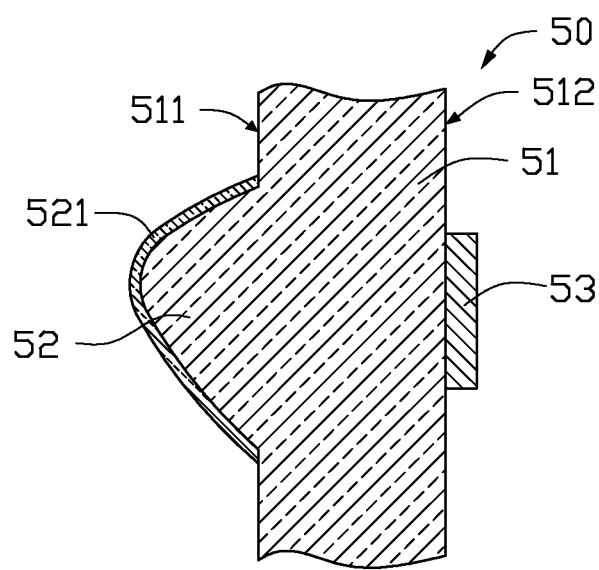
FIG. 3 is a partial, enlarged view of a reflection stripe of the display device of FIG. 1.

In the illustrated embodiment, the number of the at least one reflection stripe 50 is three. As illustrated in FIG. 3, each reflection stripe 50 includes a basal body 51, several reflection points 52 and several diffuse reflection sections 53, the several reflection points 52 and the several diffuse reflection sections 53 are respectively set in two reverse side surfaces 511 and 512 of the basal body 51. The two reverse side surfaces 511 and 512 are substantial perpendicular to the display surface, and the several reflection points 52 are aligned with the several diffuse reflection sections 53 one by one. The basal body 51 can be made of glass or plastic. The several reflection points 52 are substantial tapered-shaped or elliptic-shaped, and an outside surface of the several reflection points 52 coats a high reflectivity material layer that form a reflecting layer 521. The reflecting layer 521 and the diffuse reflection section 53 can approve the display brightness and uniformity of luminance of the reflection stripe 50. The microprocessor 40 processes the image for displaying on the first combined frame 121, the second combined frame 122 and the third combined frame 123. Then the laser projector 32 project the image to the several reflection points 52, the reflecting layer 521 and the diffuse reflection section 53, the several reflection points 52, the reflecting layer 521 and the diffuse reflection section 53 reflect the image.

When assembled, the three structural supports 20 are set on the display screen 10 and are spaced from each other. The fixing end 21 of each the structural support 20 is fixed on a surface of the display screen 10 that is substantial perpendicular to the display surface 11 of the display 111. The three laser devices 30 are respectively fixed on the supporting end 22 of the three structural supports 20, and the three laser devices 30 are opposite to the display screen 10. The microprocessor 40 is arranged on the display screen 10. The microprocessor 40 can be electrically coupled o each of the six displays 111. The microprocessor 40 and the six displays 111 form an electronic connection therebetween. The three reflection stripes 50 are respectively set on the first combined frame 121, the second combined frame 122, and the third combined frame 123. The three reflection stripes 50 cover respectively the first combined frame 121, the second combined frame 122, and the third combined frame 123.

In operation of the display device 100, the microprocessor 40 divides the image according to the number of the displays 111 that constitute the display screen 10. In the illustrated embodiment, the microprocessor 40 divides the image into six portions, and the six portions image are respectively passed to a corresponding display 111, the display 111 display a corresponding portion image. The laser scanning system 31 of the three laser devices 30 scan respectively the images displayed on the six display 111, the first combined frame 121, the second combined frame 122 and the third combined frame 123, thereby capture the display image displayed by the six display 111 and a picture consisted by the first combined frame 121, the second combined frame 122 and the third combined frame 123. The microprocessor 40 processes the image and the picture in order to gain image displayed on the six displays 111, sizes and positions of the first combined frame 121, the second combined frame 122 and the third combined frame 123. The microprocessor 40 divides the entire image into nine video footages according to the image displayed on the six display 111, the sizes and the positions of the first combined frame 121, the second combined frame 122 and the third combined frame 123, the nine video footages are respectively the image displayed on the six display 111, the image for displaying on the first combined frame 121, the second combined frame 122 and the third combined frame 123. The microprocessor 40 transfer the nine video footages to corresponding displays 111 and the laser projector 32 respectively, the displays 111 display the video footages received by the displays 111. The laser projectors 32 project respectively the video footages received by the laser projectors 32 to a corresponding reflection stripe 50, thereby the image displayed on the display screen 10 is a whole picture. In detailed, the laser projector 32 of the laser device 30 located in the middle projects the video footages corresponding to the first combined frame 121 to the reflection stripe 50 covering the first combined frame 121. The laser projector 32 of the laser device 30 located in the left side project the video footages corresponding to the second combined frame 122 to the reflection stripe 50 covering the second combined frame 122. The laser projector 32 of the laser device 30 located in the right side project the video footages corresponding to the third combined frame 123 to the reflection stripe 50 covering the third combined frame 123; the three reflection stripes are used to reflect the image reflected to them.

The embodiments shown and described above are only examples. Many details are often found in the art such as the other features of a display device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A display device comprising: a display screen comprising at least two displays arranged in a matrix, the display screen configured to display images, and each of the at least two displays comprising one or more frames; at least one laser device comprising a laser scanning system and a laser projector; a microprocessor configured to process an entire image to obtain a portion of the image corresponding to the frames between each of the at least two displays, transfer the entire image to the at least two displays, and transfer the portion of the image to the laser projector; at least one reflection stripe covering the frames between each of the at least two displays, the laser projector configured to project the the portion of image onto the reflection stripe, whereby the image displayed on the display screen and the image projected on the reflection stripe by the laser projector form a complete picture.

2. The display device of claim 1, wherein the display device comprises at least one structural support, each structural support comprises a fixing end and a supporting end.

3. The display device of claim 2, wherein each display comprises a display surface and four of the frames, heads and tails of the four frames connect to each other, thereby form a square frame, the display surface is surrounded by the square frame.

4. The display device of claim 3, wherein the fixing end is fixed on a surface of the display screen that is substantially perpendicular to the display surface, the laser device is fixed on the supporting end.

5. The display device of claim 4, wherein the number of the at least two displays is six, the six displays are arranged to a 3×2 matrix.

6. The display device of claim 5, wherein the microprocessor is arranged on the display screen.

7. The display device of claim 2, wherein each reflection stripe includes a basal body, several reflection points and several diffuse reflection sections, the several reflection points and the several diffuse reflection sections are respectively set in two reverse side surfaces of the basal body, the two reverse surfaces are substantially perpendicular to the display surface.

8. The display device of claim 7, wherein the several reflection points are aligned with the several reflection sections one by one.

9. The display device of claim 8, wherein outside surfaces of the several reflection points coat high reflectivity material to form reflecting layers.

* * * * *